(12) United States Patent
Tsai et al.

(10) Patent No.: US 8,830,432 B2
(45) Date of Patent: Sep. 9, 2014

(54) LIQUID CRYSTAL DISPLAY PANEL

(75) Inventors: Cheng-Yeh Tsai, Taipei (TW);
Tai-Hsiang Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 473 days.

(21) Appl. No.: 13/226,499

(22) Filed: Sep. 7, 2011

(65) Prior Publication Data

US 2012/0327346 A1 Dec. 27, 2012

(30) Foreign Application Priority Data

Jun. 24, 2011 (TW) .............................. 100122279 A (51) Int. Cl.
*G02F 1/1343* (2006.01)
*G02F 1/137* (2006.01)
(52) U.S. Cl.
CPC *G02F 1/134363* (2013.01); *G02F 2001/13793* (2013.01)
USPC .......................................... 349/141; 349/142
(58) Field of Classification Search
USPC ................................. 349/141, 142
See application file for complete search history.

(56) References Cited

U.S. PATENT DOCUMENTS

| 7,342,632 | B2 | 3/2008 | Miyachi et al. |
| 8,111,358 | B2 * | 2/2012 | Shibahara ........................ 349/96 |
| 2005/0179847 | A1 * | 8/2005 | Miyachi et al. ................ 349/141 |
| 2006/0077324 | A1 * | 4/2006 | Ahn ............................. 349/114 |
| 2007/0070282 | A1 | 3/2007 | Shibahara et al. |

FOREIGN PATENT DOCUMENTS

CN 102062978 5/2011

OTHER PUBLICATIONS

"Office Action of China Counterpart Application", issued on Nov. 27, 2013, p. 1-p. 8.

* cited by examiner

*Primary Examiner* — Hoan C Nguyen
(74) *Attorney, Agent, or Firm* — Jianq Chyun IP Office (57) ABSTRACT

The electrode structures in the display units of the liquid crystal display (LCD) panel described in the embodiments of the invention are formed by stacking the bottom electrodes, the insulation pattern layers, and the top electrodes. The width of each of the bottom electrodes is greater than the width of each of the top electrodes (i.e., the electrode structures have the protrusion-like shape). Therefore, the operating voltage can be effectively reduced, and the transmission rate can be improved.

25 Claims, 7 Drawing Sheets

LIQUID CRYSTAL DISPLAY PANEL

CROSS-REFERENCE TO RELATED APPLICATION

This application claims the priority benefit of Taiwan application serial no. 100122279, filed on Jun. 24, 2011. The entirety of the above-mentioned patent application is hereby incorporated by reference herein and made a part of this specification.

BACKGROUND OF THE INVENTION

1. Field of the Invention

The invention generally relates to a liquid crystal display (LCD) panel, and more particularly, to an LCD panel having stacked protruding electrodes.

2. Description of Related Art

In the year of 1888, Friedrich Reinitzer placed cholesteric benzoate in a polarizing microscope and observed that the cholesteric benzoate in an isotropic phase and in a cholesteric phase appears to have different colors (blue violet and blue), and the color change in the cholesteric benzoate occurs within a rather small temperature range (approximately 1° C.) between the isotropic phase and the cholesteric phase. In 1970, by conducting the volume analysis and applying a high-resolution differential scanning calorimeter (DSC), various scientists proved that said phenomenon is a thermodynamically stable phase and is referred to as "blue-phase".

The "phases" within the blue phase are referred to as BP I, BP II, and BP III (in increasing order of temperature), and BP III mentioned in the literature on the subject refers to a "fog phase". In comparison with the cubic structure of BP I and BP II, the structure of BP III is amorphous. The structure of BP III under the polarizing microscope appears to be unclear (i.e., BP III seems to have no specific structure) and can be barely observed with use of the polarizing microscope.

The basic unit of the structure of BP I and BP II has been confirmed to be shaped as double twist cylinders (DTC), and the orientation of the DTC ensures the lowest free energy. Besides, the double twist cylinders are perpendicular to each other. This orientation results in lattice defects and is deemed as a pre-transitional phenomenon from a liquid crystal phase to the cholesteric phase. Hence, blue phases are categorized as frustrated phases. Based on Bragg reflection, Kossel diffraction patterns, optical structures, crystal growth, and other experimental researches, it is found that BP II has a simple cubic (SC) structure (Mol. Cryst. Liq. Cryst., Vol. 465, pp. 283-288, 2007), and BP I has a body-centered cubic (BCC) structure. Different from other liquid crystal phases (e.g., nematic phases, smectic phases, and isotropic phases), BP I and BP II frequently exhibit color patterns (J.A.C.S, 2008, 130, 6326, Kikuchi et. al.) with the platelet texture when observed under the polarizing microscope. This is because the lattice period gives rise to the Bragg reflection within the wavelength range of visible light.

Normal liquid crystal phases are optically anisotropic, while the blue phases are optical isotropic. That is to say, the blue phases have low or zero birefringence.

The lattice periods of the blue phases are functions of the wavelength of visible light, thus resulting in the selective Bragg reflection. Accordingly, the blue-phase liquid crystal can be applied to fast light modulators. However, in spite of theoretical prediction or experimental observation, it is found that the blue-phase liquid crystal merely exists in the molecular material with high purity and high chirality, and therefore the blue-phase liquid crystal exists within a small temperature range (less than 2° C.). This is the reason why the blue-phase liquid crystal is often discussed in the academia rather than in real field of applications.

In the last decade, the blue phases characterized by fast response speed draw the attention of the academia and the industry for the purpose of improving the display quality of LCD panels to surpass the display quality of cathode ray tube (CRT) displays. In consideration of actual applications, the blue-phase liquid crystal needs to be applied within a wide temperature range, and thus various technical developments in this regard have been proposed. For instance, the blue-phase liquid crystal that can exist within a wide range of temperature is generated due to stability of polymers (i.e., formation of polymer meshed structure) (Nature materials, 2002, 1, 64). Additionally, in 2002, Kikuchi et al. placed a small amount of monomers and photoresist into the blue-phase liquid crystal which was then irradiated by light within the blue-phase temperature range, and thereby the stable blue-phase liquid crystal that has a gel-like structure and can exist within a temperature range of approximately 60° C. is successfully generated.

Although the blue-phase liquid crystal is characterized by fast response speed and optical isotropy, the operating voltage of the blue-phase liquid crystal is relatively high and can reach up to 55 V. In terms of mass production, the high operating voltage of the blue-phase liquid crystal is one of the issues to be resolved.

SUMMARY OF THE INVENTION

The invention is directed to a blue-phase LCD panel having a low operating voltage.

The invention is further directed to an LCD panel having a low operating voltage.

In an embodiment of the invention, a blue-phase LCD panel that includes a first substrate, a second substrate, and a blue-phase liquid crystal layer is provided. The first substrate has a plurality of display units. Each of the display units includes at least one first electrode structure and at least one second electrode structure. The first electrode structure and the second electrode structure are alternately arranged on the first substrate. The first electrode structure includes a first bottom electrode, a first top electrode, and a first insulation pattern layer. The first bottom electrode is configured on the first substrate. The first insulation pattern layer is configured between the first bottom electrode and the first top electrode. The width of the first bottom electrode is greater than the width of the first top electrode. The second electrode structure includes a second bottom electrode, a second top electrode, and a second insulation pattern layer. The second bottom electrode is configured on the first substrate. The second insulation pattern layer is configured between the second bottom electrode and the second top electrode. The width of the second bottom electrode is greater than the width of the second top electrode. The first bottom electrode is electrically connected to the second top electrode, such that the first bottom electrode and the second top electrode have a first potential. The first top electrode is electrically connected to the second bottom electrode, such that the first top electrode and the second bottom electrode have a second potential. The first potential is different from the second potential, such that an electric field is generated between the first potential and the second potential. The second substrate is opposite to the first substrate. The blue-phase liquid crystal layer is configured between the first substrate and the second substrate. The blue-phase liquid crystal layer has a plurality of blue-phase liquid crystal molecules that are rotated according to the electric field.

According to an embodiment of the invention, each of the display units further includes a switch element which is electrically connected to the first bottom electrode and the second top electrode.

According to an embodiment of the invention, the width of the first top electrode is the same as the width of the first insulation pattern layer, for instance, and the width of the second top electrode is the same as the width of the second insulation pattern layer, for instance.

According to an embodiment of the invention, a partial region of the first bottom electrode is not covered by the first insulation pattern layer, for instance, and a partial region of the second bottom electrode is not covered by the second insulation pattern layer, for instance.

According to an embodiment of the invention, the width of the first insulation pattern layer ranges from the width of the first bottom electrode to the width of the first top electrode, for instance, and the width of the second insulation pattern layer ranges from the width of the second bottom electrode to the width of the second top electrode, for instance.

According to an embodiment of the invention, the distance between the first bottom electrode and the adjacent second bottom electrode is P1, the distance between the first top electrode and the adjacent second top electrode is P2, and P2>P1.

According to an embodiment of the invention, the width of each of the first bottom electrodes is the same as the width of each of the second bottom electrodes, for instance, and the width of each of the first top electrodes is the same as the width of each of the second top electrodes, for instance.

According to an embodiment of the invention, the thickness of each of the first insulation pattern layers and the thickness of each of the second insulation pattern layers are D, respectively, and D<P1.

According to an embodiment of the invention, a fringe field effect occurs between the first bottom electrode and the first top electrode in the first electrode structure, and a fringe field effect occurs between the second bottom electrode and the second top electrode in the second electrode structure, for instance.

According to an embodiment of the invention, the first insulation pattern layer and the second insulation pattern layer do not cover an area between the first bottom electrode and the second bottom electrode, for instance.

According to an embodiment of the invention, the blue-phase liquid crystal layer is a positive blue-phase liquid crystal layer, for instance.

According to an embodiment of the invention, the first bottom electrode, the first top electrode, the second top electrode, and the second bottom electrode are shaped as bars, bending bars, or wave-shaped bars, for instance.

According to an embodiment of the invention, each of the display units further includes a first switch element and a second switch element. The first switch element is electrically connected to the first bottom electrode and the second top electrode. The second switch element is electrically connected to the first top electrode and the second bottom electrode.

In an embodiment of the invention, an LCD panel that includes a first substrate, a second substrate, and a positive liquid crystal layer is further provided. The first substrate has a plurality of display units. Each of the display units includes at least one first electrode structure and at least one second electrode structure. The first electrode structure and the second electrode structure are alternately arranged on the first substrate. The first electrode structure includes a first bottom electrode, a first top electrode, and a first insulation pattern layer. The first bottom electrode is configured on the first substrate. The first insulation pattern layer is configured between the first bottom electrode and the first top electrode. The width of the first bottom electrode is greater than the width of the first top electrode. The second electrode structure includes a second bottom electrode, a second top electrode, and a second insulation pattern layer. The second bottom electrode is configured on the first substrate. The second insulation pattern layer is configured between the second bottom electrode and the second top electrode. The width of the second bottom electrode is greater than the width of the second top electrode. The first bottom electrode is electrically connected to the second top electrode, such that the first bottom electrode and the second top electrode have a first potential. The first top electrode is electrically connected to the second bottom electrode, such that the first top electrode and the second bottom electrode have a second potential. The first potential is different from the second potential, such that an electric field is generated between the first potential and the second potential. The second substrate is opposite to the first substrate. The positive liquid crystal layer is configured between the first substrate and the second substrate. The positive liquid crystal layer has a plurality of positive liquid crystal molecules that are rotated according to the electric field.

According to an embodiment of the invention, each of the display units further includes a switch element which is electrically connected to the first bottom electrode and the second top electrode.

According to an embodiment of the invention, the width of the first top electrode is the same as the width of the first insulation pattern layer, for instance, and the width of the second top electrode is the same as the width of the second insulation pattern layer, for instance.

According to an embodiment of the invention, a partial region of the first bottom electrode is not covered by the first insulation pattern layer, for instance, and a partial region of the second bottom electrode is not covered by the second insulation pattern layer, for instance.

According to an embodiment of the invention, the width of the first insulation pattern layer ranges from the width of the first bottom electrode to the width of the first top electrode, for instance, and the width of the second insulation pattern layer ranges from the width of the second bottom electrode to the width of the second top electrode, for instance.

According to an embodiment of the invention, the distance between the first bottom electrode and the adjacent second bottom electrode is P1, the distance between the first top electrode and the adjacent second top electrode is P2, and P2>P1.

According to an embodiment of the invention, the width of each of the first bottom electrodes is the same as the width of each of the second bottom electrodes, for instance, and the width of each of the first top electrodes is the same as the width of each of the second top electrodes, for instance.

According to an embodiment of the invention, the thickness of each of the first insulation pattern layers and the thickness of each of the second insulation pattern layers are D, respectively, and D<P1.

According to an embodiment of the invention, a fringe field effect occurs between the first bottom electrode and the first top electrode in the first electrode structure, and a fringe field effect occurs between the second bottom electrode and the second top electrode in the second electrode structure.

According to an embodiment of the invention, the first insulation pattern layer and the second insulation pattern layer do not cover an area between the first bottom electrode and the second bottom electrode, for instance.

According to an embodiment of the invention, the first top electrode, the first bottom electrode, the second top electrode, and the second bottom electrode are shaped as bars, bending bars, or wave-shaped bars, for instance.

According to an embodiment of the invention, each of the display units further includes a first switch element and a second switch element. The first switch element is electrically connected to the first bottom electrode and the second top electrode. The second switch element is electrically connected to the first top electrode and the second bottom electrode.

Based on the above, the electrode structures in the LCD panel described in the embodiments of the invention are formed by stacking the bottom electrodes, the insulation pattern layers, and the top electrodes, and the width of each of the bottom electrodes is greater than the width of each of the top electrodes (i.e., the electrode structures have the protrusion-like shape). Therefore, the operating voltage can be effectively reduced, and the transmission rate can be improved.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
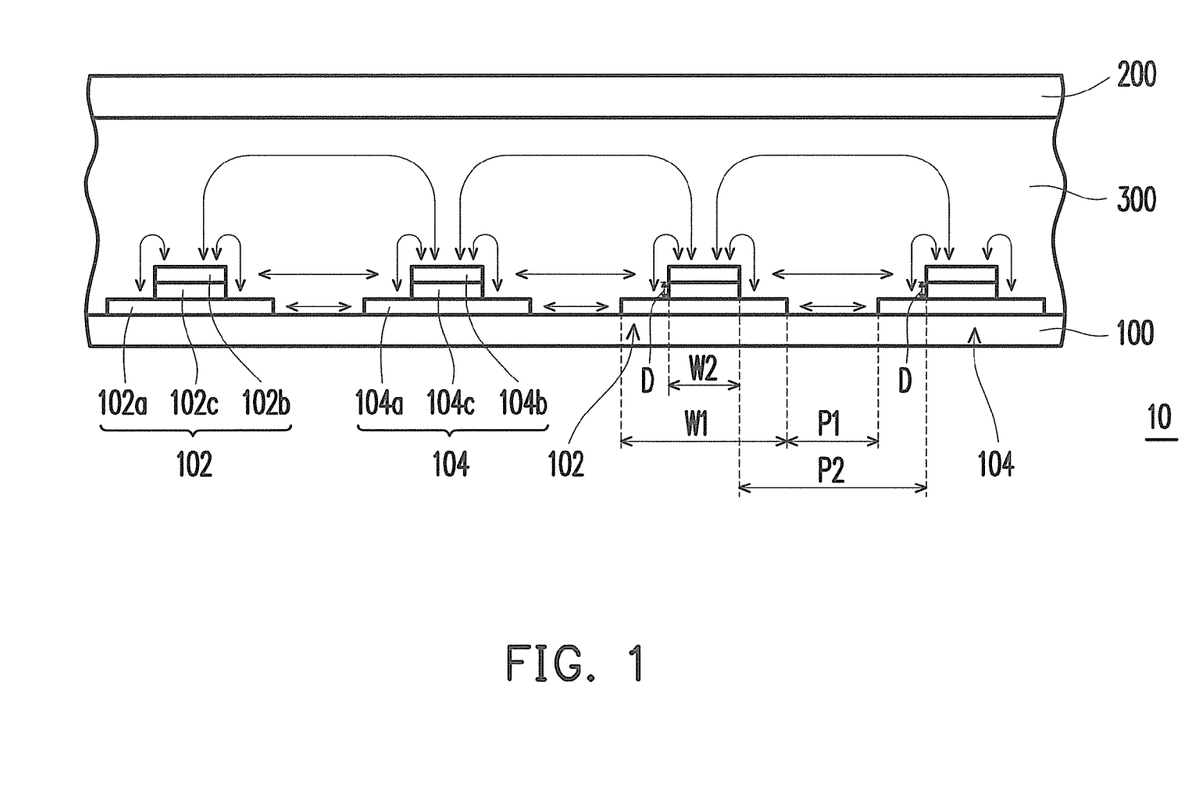
FIG. 1 is a schematic cross-sectional view illustrating an LCD panel according to a first embodiment of the invention.
Figure 2:
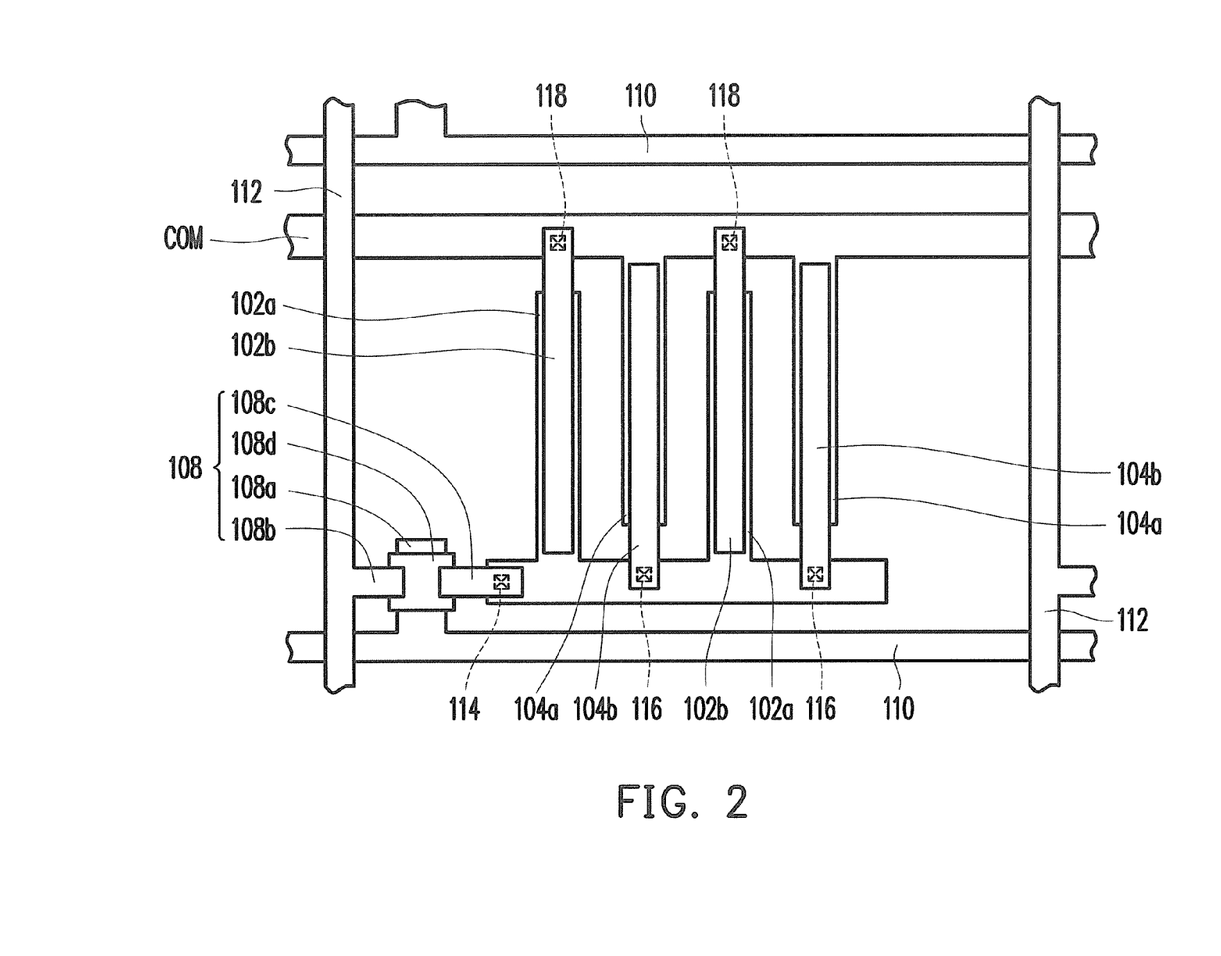
FIG. 2 is a schematic top view illustrating an active array substrate in the LCD panel depicted in FIG. 1.
Figure 3:
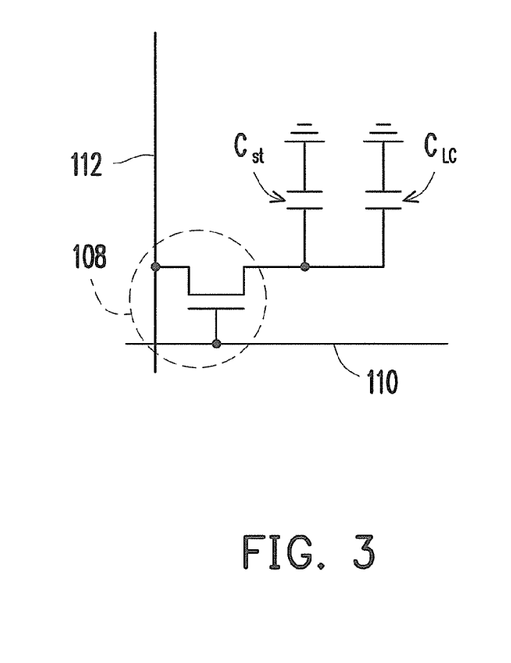
FIG. 3 is a circuit diagram corresponding to the active array substrate depicted in FIG. 2.

FIG. 1 is a schematic cross-sectional view illustrating an LCD panel according to a first embodiment of the invention. FIG. 2 is a schematic top view illustrating an active array substrate in the LCD panel depicted in FIG. 1. FIG. 3 is a circuit diagram corresponding to active array substrate depicted in FIG. 2. With reference to FIG. 1, FIG. 2, and FIG. 3, the LCD panel 10 of this embodiment includes a first substrate 100, a second substrate 200, and a liquid crystal layer 300. The first substrate 100 is an active device array substrate, for instance, and the second substrate 200 is a color filter substrate, for instance. The first substrate 100 is opposite to the second substrate 200. The liquid crystal layer 300 is configured between the first substrate 100 and the second substrate 200, and the liquid crystal layer 300 is a blue-phase liquid crystal layer, for instance. Here, the blue-phase liquid crystal layer can be a positive blue-phase liquid crystal layer. There is a plurality of blue-phase liquid crystal molecules in the blue-phase liquid crystal layer. In order to broaden the blue-phase temperature range of the blue-phase liquid crystal molecules, the blue-phase liquid crystal molecules can be stabilized by polymers. The liquid crystal layer 300 can also be any positive liquid crystal layer other than the blue-phase liquid crystal layer. In this case, a plurality of positive liquid crystal molecules is disposed in the positive liquid crystal layer. Since the blue-phase liquid crystal molecules and the positive liquid crystal molecules are well-known to people having ordinary skill in the art, no further description is provided herein. The liquid crystal molecules in the liquid crystal layer 300 can be rotated according to the electric field generated by the electrodes in the first substrate 100, which will be further elaborated.

The first substrate 100 has a plurality of display units. In the embodiment, one display unit is depicted for the purpose of clear illustration and explanation. The display unit of the first substrate 100 includes first electrode structures 102 and second electrode structures 104. Two first electrode structures 102 and two second electrode structures 104 are depicted in this embodiment, which should not be construed as a limitation to the invention. The first electrode structures 102 and the second electrode structures 104 are alternately arranged on the first substrate 100.

Each of the first electrode structures 102 includes a first bottom electrode 102a, a first top electrode 102b, and a first insulation pattern layer 102c. The first bottom electrode 102a is configured on the first substrate 100. The first top electrode 102b is configured on the first bottom electrode 102a. The first insulation pattern layer 102c is configured between the first bottom electrode 102a and the first top electrode 102b. In this embodiment, the first bottom electrode 102a has the width W1, the first top electrode 102b has the width W2, and W1 is greater than W2. Besides, the width of the first insulation pattern layer 102c is the same as the width of the first top electrode 102b. Hence, the first electrode structures 102 can have a protrusion-like shape. In other embodiments of the invention, the width of the first insulation pattern layer 102c may range from the width W1 of the first bottom electrode 102a to the width W2 of the first top electrode 102b. Namely, in this embodiment, a partial region of the first bottom electrode 102a is not covered by the first insulation pattern layer 102c.

Each of the second electrode structures 104 includes a second bottom electrode 104a, a second top electrode 104b, and a second insulation pattern layer 104c. The second bottom electrode 104a is configured on the first substrate 100. The second top electrode 104b is configured on the second bottom electrode 104a. A counter electrode constituted by the connection portions of the second bottom electrodes 104a can be referred to as a common electrode COM. The second insulation pattern layer 104c is configured between the second bottom electrode 104a and the second top electrode 104b. In this embodiment, the width of the second bottom electrode 104a is the same as the width of the first bottom electrode 102a, for instance, and the width of the second top electrode 104b is the same as the width of the first top electrode 102b, for instance. Namely, the second bottom electrode 104a has the width W1, and the second top electrode 104b has the width W2. Besides, the width of the second insulation pattern layer 104c is the same as the width of the second top electrode 104b. Hence, the second electrode structures 104 can have the protrusion-like shape. Similarly, in other embodiments of the invention, the width of the second insulation pattern layer 104c may range from the width W1 of the second bottom electrode 104a to the width W2 of the second top electrode 104b. Namely, in this embodiment, a partial region of the second bottom electrode 104a is not covered by the second insulation pattern layer 104c.

The first bottom electrode 102a, the first top electrode 102b, the second bottom electrode 104a, and the second top electrode 104b described in this embodiment can be shaped as bars, which should not be construed as a limitation to the invention. The first bottom electrode 102a, the first top electrode 102b, the second bottom electrode 104a, and the second top electrode 104b described in other embodiments can be shaped as bending bars or wave-shaped bars.

In addition, a distance between each first bottom electrode 102a and an adjacent one of the second bottom electrodes 104a is P1, a distance between each first top electrode 102b and the adjacent one of the second top electrodes 104b is P2, and P1 is greater than P2. The first insulation pattern layers 102c and the second insulation pattern layers 104c do not cover an area between the first bottom electrodes 102a and the second bottom electrodes 104a. Besides, each of the first insulation pattern layers 102c and the second insulation pattern layers 104c has a thickness D, and D<P1, for instance.

According to this embodiment, the width W1, the width W2, the distance P1, and the distance P2 can be preferably represented by the equation (W1−W2)/2=(P1−P2)/2, which should not be construed as a limitation to the invention. That is to say, in this embodiment, the first top electrodes 102b and the first insulation pattern layers 102c are located at the central areas of the first bottom electrodes 102a, and the second top electrodes 104b and the second insulation pattern layers 104c are located at the central areas of the second bottom electrodes 104a.

Each of the display units on the first substrate 100 further includes a switch element 108. Here, the switch element 108 is a thin film transistor (TFT), for instance. The switch element 108 has a gate 108a, a source 108b, a drain 108c, and an active layer 108d, for instance. The first substrate 100 further has a plurality of scan lines 110 and a plurality of data lines 112. The intersecting scan line 110 and data line 112 are electrically connected to the switch element 108, respectively.

Figure 6:
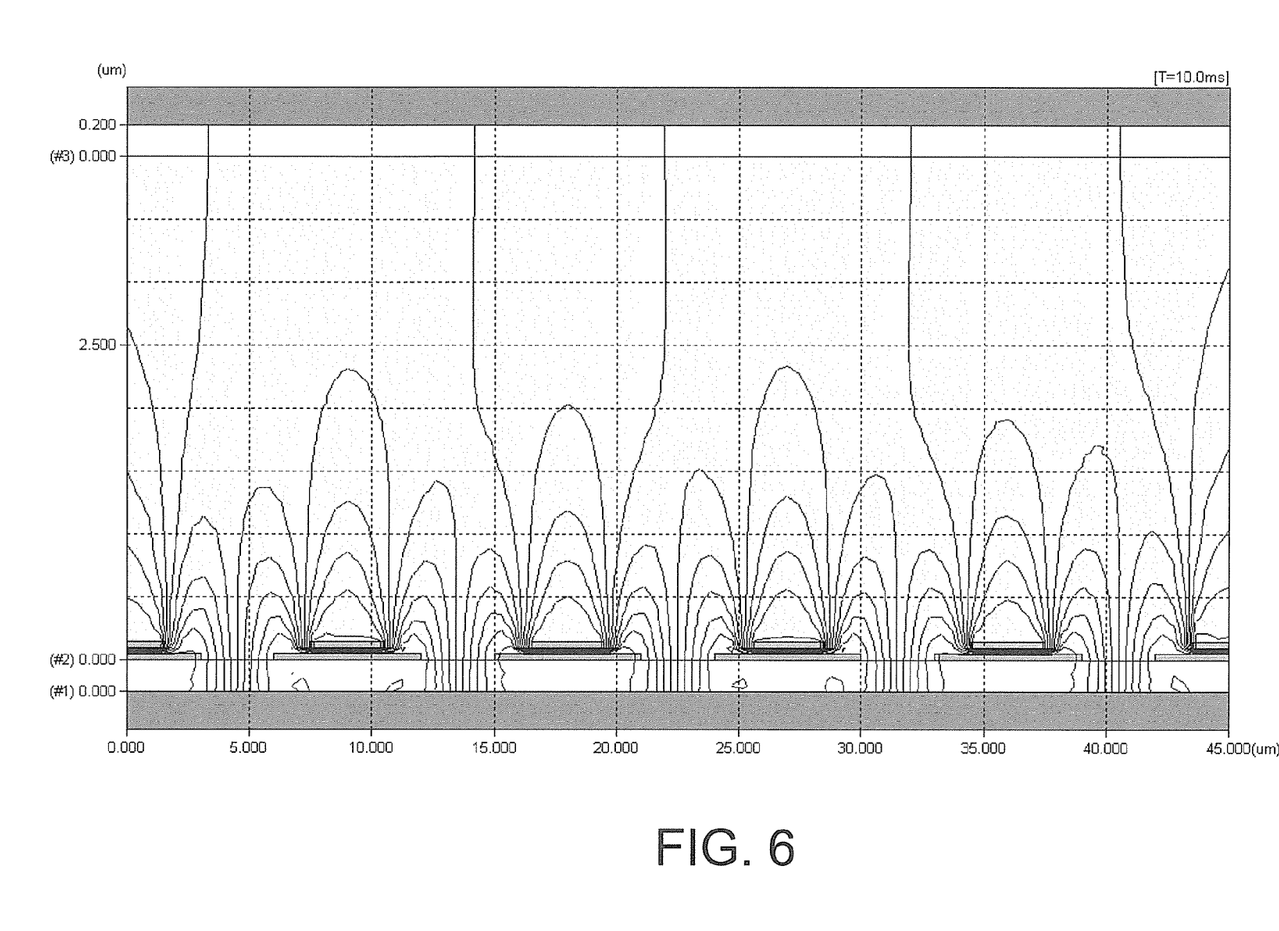
FIG. 6 is a schematic diagram illustrating an electric field of each electrode structure according to an embodiment of the invention.

The drain 108c of the switch element 108 is electrically connected to the first bottom electrodes 102a through a contact window 114. The first top electrodes 102b are electrically connected to the second bottom electrodes 104a. Thereby, there is a storage capacitor $C_{st}$ between each of the first bottom electrodes 102a and each of the first top electrodes 102b and between each of the second bottom electrodes 104a and each of the second top electrodes 104b. The first bottom electrodes 102a and the second top electrodes 104b are electrically connected through the contact 116 and serve as pixel electrodes. Besides, the first bottom electrodes 102a and the second top electrodes 104b have a first potential. The first top electrodes 102b and the second bottom electrodes 104a are electrically connected through the contact 118 and serve as counter electrodes or common electrodes. Besides, the first top electrodes 102b and the second bottom electrodes 104a have a second potential. The first potential is different from the second potential, such that an electric field is generated between the first potential and the second potential. As shown by the arrows in FIG. 1, fringe field effects exist between the first bottom electrodes 102a and the first top electrodes 102b and between the second bottom electrodes 104a and the second top electrodes 104b, and in-plane field effects exist between the first bottom electrodes 102a and the second bottom electrodes 104a and between the first top electrodes 102b and the second top electrodes 104b. Liquid crystal molecules in the liquid crystal layer 300 are rotated due to the fringe field effects and the in-plane field effects. The electric field is schematically shown in FIG. 6.

Figure 4:
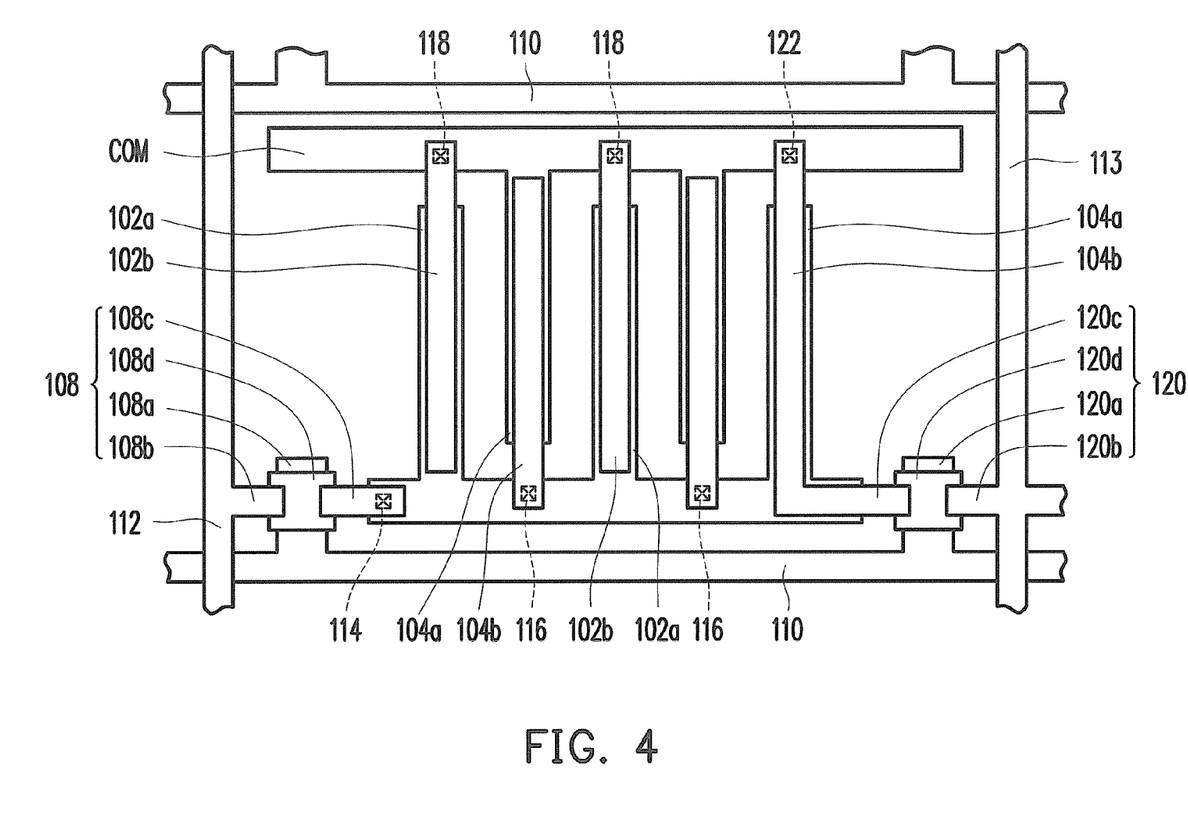
FIG. 4 is a schematic top view illustrating an active array substrate according to a second embodiment of the invention.
Figure 5:
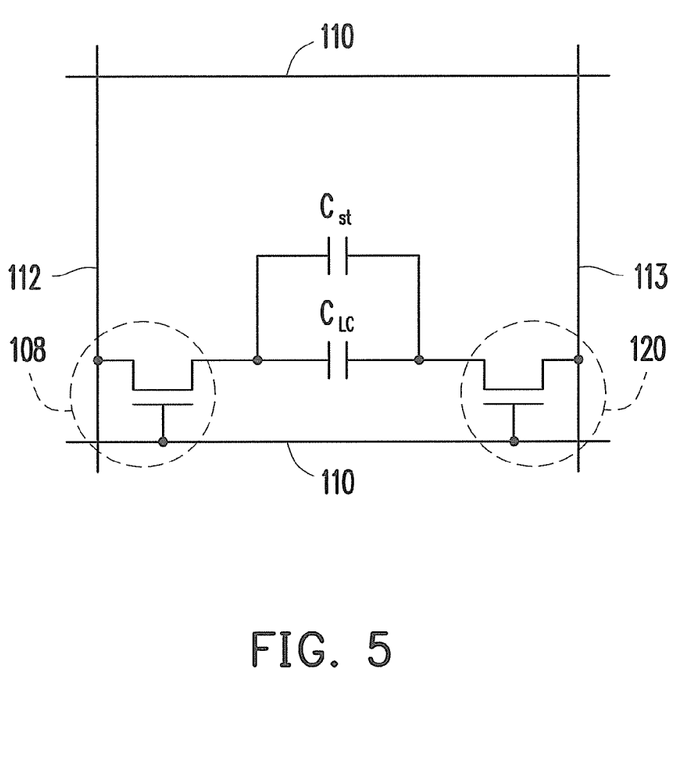
FIG. 5 is a circuit diagram corresponding to the active array substrate depicted in FIG. 4.

FIG. 4 is a schematic top view illustrating an active array substrate according to a second embodiment of the invention. FIG. 5 is a circuit diagram corresponding to active array substrate depicted in FIG. 4. Similar elements in the first and the second embodiments are marked by the same reference numbers. With reference to FIG. 4 and FIG. 5, the difference between the first embodiment and this embodiment lies in that each display unit in the first substrate 100 further includes a switch element 120. The switch element 120 is a TFT, for instance. The switch element 120 has a gate 120a, a source 120b, a drain 120c, and an active layer 120d, for instance. One of the scan lines 110 and one of the data lines 113 are electrically connected to the switch element 120, respectively. The drain 120c of the switch element 120 is electrically connected to the second bottom electrodes 104a through contact 122.

In this embodiment, each display unit in the first substrate 100 includes two switch elements (i.e., the switch element 118 and the switch element 120). Thus, in comparison with the operating voltage of the display unit having one switch element, as described in the first embodiment, the operating voltage of the display unit in this embodiment can be effectively reduced. For instance, in the first embodiment, the operating voltage at +40V is applied to the switch element 118; in this embodiment, the operating voltage at +20V can be applied to the switch element 118, and the operating voltage at −20V can be applied to the switch element 120. As such, the voltage difference in the first embodiment and in this embodiment is 40V, whereas the operating voltage in this embodiment can be significantly reduced by half.

The correlation between the operating voltage and the transmission rate is elaborated with reference to the following experimental examples and the comparison examples.

Experimental Example 1 the liquid crystal molecules in the LCD of the invention are blue-phase liquid crystal molecules, the width of each bottom electrode is 4 μm, the width of each top electrode is 3 μm, and the distance between each bottom electrode is 3 μm.

Experimental Example 2 the liquid crystal molecules in the LCD of the invention are blue-phase liquid crystal molecules, the width of each bottom electrode is 5 μm, the width of each top electrode is 3 μm, and the distance between each bottom electrode is 3 μm.

Experimental Example 3 the liquid crystal molecules in the LCD of the invention are blue-phase liquid crystal molecules, the width of each bottom electrode is 6 μm, the width of each top electrode is 3 μm, and the distance between each bottom electrode is 3 μm.

Comparison Example 1 in the in-plane switching (IPS) LCD panel, the width of each electrode is 3 μm, and the distance between each electrode is 3 μm.

Comparison Example 2 each of the electrode structures is constituted by stacking the bottom electrode, the insulation pattern layer, and the top electrode layer, the bottom electrodes and the top electrodes in each electrode structure have the same polarity (all positive or negative), the width of each bottom electrode, the width of each insulation pattern layer, and the width of each top electrode in the electrode structures are 3 μm, respectively, and the distance between each bottom electrode is 3 μm.

Figure 7:
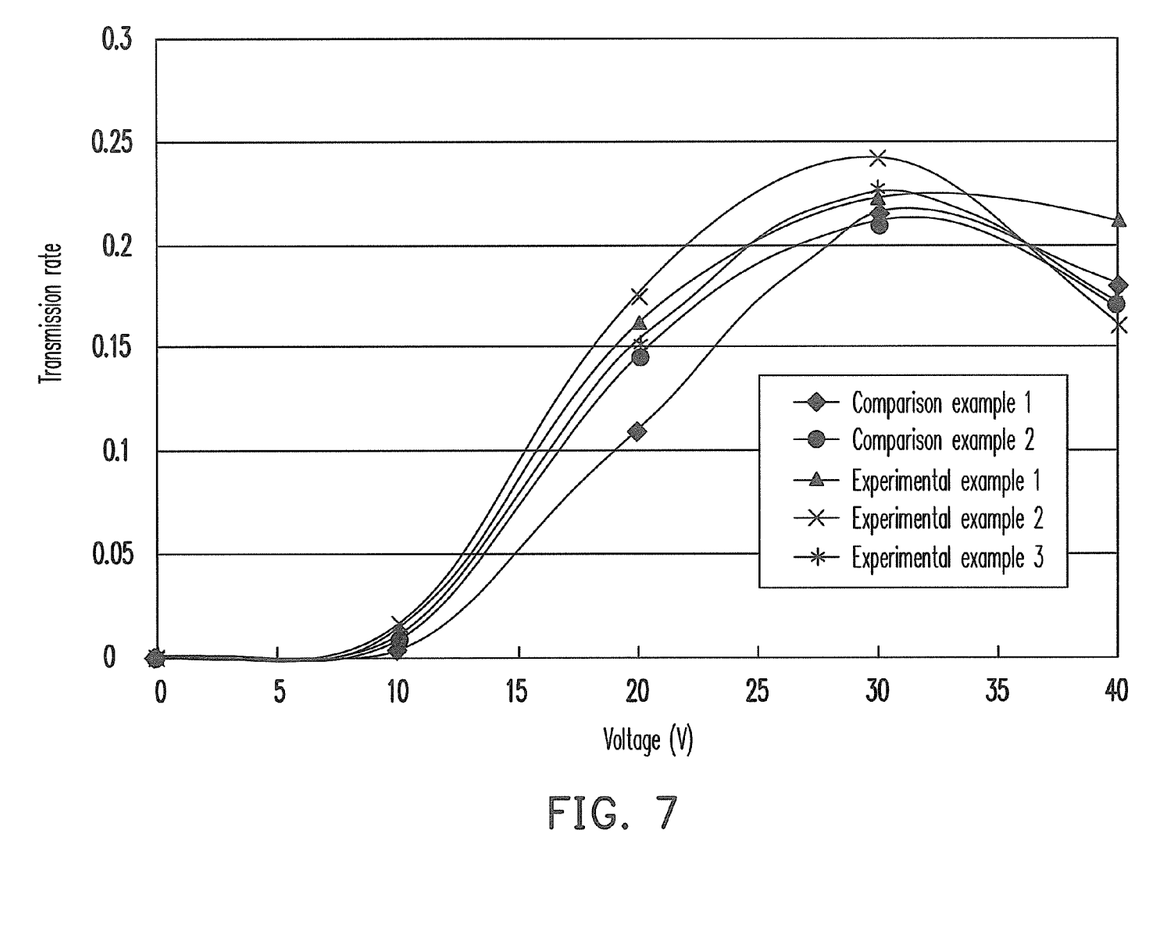
FIG. 7 illustrates the correlation between the operating voltage and the transmission rate in comparison examples and an embodiment of the invention.

FIG. 7 illustrates the correlation between the voltage and the transmission rate in comparison examples and an embodiment of the invention. As shown in FIG. 7, the LCD panel of this invention (experimental examples 1, 2, and 3) can have a relatively high transmission rate when the same operating voltage is given. Besides, given the same transmission rate, the operating voltage can remain relatively low.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A blue-phase liquid crystal display panel comprising:
   a first substrate having a plurality of display units, each of the display units comprising:
   at least one first electrode structure comprising a first bottom electrode, a first top electrode, and a first insulation pattern layer, the first bottom electrode being configured on the first substrate, the first insulation pattern layer being configured between the first bottom electrode and the first top electrode, a width of the first bottom electrode being greater than a width of the first top electrode; and
   at least one second electrode structure, the at least one first electrode structure and the at least one second electrode structure being alternately arranged on the first substrate, the second electrode structure comprising a second bottom electrode, a second top electrode, and a second insulation pattern layer, the second bottom electrode being configured on the first substrate, the second insulation pattern layer being configured between the second bottom electrode and the second top electrode, a width of the second bottom electrode being greater than a width of the second top electrode, wherein the first bottom electrode is electrically connected to the second top electrode, such that the first bottom electrode and the second top electrode have a first potential, the first top electrode is electrically connected to the second bottom electrode, such that the first top electrode and the second bottom electrode have a second potential, and the first potential is different from the second potential to generate an electric field between the first potential and the second potential;
   a second substrate configured opposite to the first substrate; and
   a blue-phase liquid crystal layer configured between the first substrate and the second substrate, the blue-phase liquid crystal layer having a plurality of blue-phase liquid crystal molecules, the blue-phase liquid crystal molecules being rotated according to the electric field.

2. The blue-phase liquid crystal display panel as recited in claim 1, each of the display units further comprising a switch element, the switch element being electrically connected to the first bottom electrode and the second top electrode.

3. The blue-phase liquid crystal display panel as recited in claim 1, wherein the width of the first top electrode is the same as a width of the first insulation pattern layer, and the width of the second top electrode is the same as a width of the second insulation pattern layer.

4. The blue-phase liquid crystal display panel as recited in claim 1, wherein a partial region of the first bottom electrode is not covered by the first insulation pattern layer, and a partial region of the second bottom electrode is not covered by the second insulation pattern layer.

5. The blue-phase liquid crystal display panel as recited in claim 1, wherein a width of the first insulation pattern layer ranges from the width of the first bottom electrode to the width of the first top electrode, and a width of the second insulation pattern layer ranges from the width of the second bottom electrode to the width of the second top electrode.

6. The blue-phase liquid crystal display panel as recited in claim 1, wherein a distance between each of the first bottom electrodes and an adjacent one of the second bottom electrodes is P1, a distance between each of the first top electrodes and an adjacent one of the second top electrodes is P2, and P2>P1.

7. The blue-phase liquid crystal display panel as recited in claim 6, wherein the width of each of the first bottom electrodes is the same as the width of each of the second bottom electrodes, and the width of each of the first top electrodes is the same as the width of each of the second top electrodes.

8. The blue-phase liquid crystal display panel as recited in claim 6, wherein a thickness of each of the first insulation pattern layers and a thickness of each of the second insulation pattern layers are D, respectively, and D<P1.

9. The blue-phase liquid crystal display panel as recited in claim 1, wherein a fringe field effect occurs between the first bottom electrode and the first top electrode in the first electrode structure, and a fringe field effect occurs between the second bottom electrode and the second top electrode in the second electrode structure.

10. The blue-phase liquid crystal display panel as recited in claim 1, wherein the first insulation pattern layer and the second insulation pattern layer do not cover an area between the first bottom electrode and the second bottom electrode.

11. The blue-phase liquid crystal display panel as recited in claim 1, wherein the blue-phase liquid crystal layer comprises a positive blue-phase liquid crystal layer.

12. The blue-phase liquid crystal display panel as recited in claim 1, wherein a shape of the first top electrode, a shape of the first bottom electrode, a shape of the second top electrode, and a shape of the second bottom electrode comprise bars, bending bars, or wave-shaped bars.

13. The blue-phase liquid crystal display panel as recited in claim 1, wherein each of the display units further comprises:
   a first switch element electrically connected to the first bottom electrode and the second top electrode; and
   a second switch element electrically connected to the first top electrode and the second bottom electrode.

14. A liquid crystal display panel comprising:
   a first substrate having a plurality of display units, each of the display units comprising:
   at least one first electrode structure comprising a first bottom electrode, a first top electrode, and a first insulation pattern layer, the first bottom electrode being configured on the first substrate, the first insulation pattern layer being configured between the first bottom electrode and the first top electrode, a width of the first bottom electrode being greater than a width of the first top electrode; and
   at least one second electrode structure, the at least one first electrode structure and the at least one second electrode structure being alternately arranged on the first substrate, the second electrode structure comprising a second bottom electrode, a second top electrode, and a second insulation pattern layer, the second bottom electrode being configured on the first substrate, the second insulation pattern layer being configured between the second bottom electrode and the second top electrode, a width of the second bottom electrode being greater than a width of the second top electrode, wherein the first bottom electrode is electrically connected to the second top electrode, such that the first bottom electrode and the second top electrode have a first potential, the first top electrode is electrically connected to the second bottom electrode, such that the first top electrode and the second bottom electrode have a second potential, and the first potential is different from the second potential to generate an electric field between the first potential and the second potential;

a second substrate configured opposite to the first substrate; and a positive liquid crystal layer configured between the first substrate and the second substrate, the positive liquid crystal layer having a plurality of positive liquid crystal molecules, the positive liquid crystal molecules being rotated according to the electric field.

15. The liquid crystal display panel as recited in claim 14, each of the display units further comprising a switch element, the switch element being electrically connected to the first bottom electrode and the second top electrode.

16. The liquid crystal display panel as recited in claim 14, wherein the width of the first top electrode is the same as a width of the first insulation pattern layer, and the width of the second top electrode is the same as a width of the second insulation pattern layer.

17. The liquid crystal display panel as recited in claim 14, wherein a partial region of the first bottom electrode is not covered by the first insulation pattern layer, and a partial region of the second bottom electrode is not covered by the second insulation pattern layer.

18. The liquid crystal display panel as recited in claim 14, wherein a width of the first insulation pattern layer ranges from the width of the first bottom electrode to the width of the first top electrode, and a width of the second insulation pattern layer ranges from the width of the second bottom electrode to the width of the second top electrode.

19. The liquid crystal display panel as recited in claim 14, wherein a distance between each of the first bottom electrodes and an adjacent one of the second bottom electrodes is P1, a distance between each of the first top electrodes and an adjacent one of the second top electrodes is P2, and P2>P1.

20. The liquid crystal display panel as recited in claim 19, wherein the width of each of the first bottom electrodes is the same as the width of each of the second bottom electrodes, and the width of each of the first top electrodes is the same as the width of each of the second top electrodes.

21. The liquid crystal display panel as recited in claim 19, wherein a thickness of each of the first insulation pattern layers and a thickness of each of the second insulation pattern layers are D, respectively, and D<P1.

22. The liquid crystal display panel as recited in claim 14, wherein a fringe field effect occurs between the first bottom electrode and the first top electrode in the first electrode structure, and a fringe field effect occurs between the second bottom electrode and the second top electrode in the second electrode structure.

23. The liquid crystal display panel as recited in claim 14, wherein the first insulation pattern layers and the second insulation pattern layers do not cover an area between the first bottom electrodes and the second bottom electrodes.

24. The liquid crystal display panel as recited in claim 14, wherein a shape of the first top electrode, a shape of the first bottom electrode, a shape of the second top electrode, and a shape of the second bottom electrode comprise bars, bending bars, or wave-shaped bars.

25. The liquid crystal display panel as recited in claim 14, wherein each of the display units further comprises:
a first switch element electrically connected to the first bottom electrode and the second top electrode; and
a second switch element electrically connected to the first top electrode and the second bottom electrode.

* * * * *